United States Patent
Gan et al.

(10) Patent No.: US 9,742,164 B2
(45) Date of Patent: Aug. 22, 2017

(54) SECONDARY DISCONNECT ASSEMBLY FOR A SWITCHING DEVICE

(71) Applicant: General Electric Company, Schenectady, NY (US)

(72) Inventors: Nikhil Purushottam Gan, Hyderabad Telangana (IN); Tejas Ashutosh Deshpande, Hyderabad Telangana (IN); Sravan Kumar Gudla, Hyderabad Telangana (IN); Shravan Purohit, Hyderabad Telangana (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 251 days.

(21) Appl. No.: 14/740,548

(22) Filed: Jun. 16, 2015

(65) Prior Publication Data

US 2016/0372899 A1    Dec. 22, 2016

(51) Int. Cl.
*H02B 11/12* (2006.01)
*H02B 11/127* (2006.01)

(52) U.S. Cl.
CPC ................. *H02B 11/127* (2013.01)

(58) Field of Classification Search
CPC .................. H02B 11/127; H02B 11/133–1/36
USPC ....................... 200/50.21, 50.24, 50.28, 50.3
See application file for complete search history.

(56) References Cited

U.S. PATENT DOCUMENTS

| | | | |
|---|---|---|---|
| 4,020,301 A | 4/1977 | Ericson et al. | |
| 4,139,748 A * | 2/1979 | Wolfe | H02B 11/00 200/50.26 |
| 4,761,521 A * | 8/1988 | Beck | H02B 11/00 200/50.21 |
| 5,036,427 A * | 7/1991 | Krom | H02B 11/127 200/50.17 |
| 5,434,369 A | 7/1995 | Tempco et al. | |
| 5,594,221 A | 1/1997 | Drumbor et al. | |
| 5,635,690 A * | 6/1997 | Knecht | H01R 13/707 200/50.3 |
| 5,691,518 A | 11/1997 | Jones et al. | |
| 6,179,637 B1 | 1/2001 | Lee et al. | |

(Continued)

FOREIGN PATENT DOCUMENTS

EP        133152 A1    2/1985

OTHER PUBLICATIONS

"Medium Voltage Advance Metal-Clad Switchgear Specification", ABB AdvanceSpec 1VAL107001-SS Rev. E, pp. 1-19, Mar. 2008.

*Primary Examiner* — Vanessa Girardi
(74) *Attorney, Agent, or Firm* — GE Global Patent Operation; Stephen G. Midgley

(57) ABSTRACT

A secondary disconnect assembly for a switching device includes a first mounting bracket configured to support a secondary connector of a switching device system, a telescopic arrangement connected to the first mounting bracket, a slider connected to the telescopic arrangement, and a second mounting bracket including a projection. The second mounting bracket is operable to move with the switching device. The slider is engageable with the projection and movable with the second mounting bracket in an automatic operation of the secondary disconnect assembly. The slider is disengageable from the projection and movable with respect to the second mounting bracket in a manual operation of the secondary disconnect assembly.

20 Claims, 11 Drawing Sheets

(56) References Cited

U.S. PATENT DOCUMENTS

| | | | |
|---|---|---|---|
| 7,688,572 B2 * | 3/2010 | Yee | H02B 1/36 |
| | | | 200/50.08 |
| 7,927,155 B2 | 4/2011 | Mittu et al. | |
| 8,497,439 B2 | 7/2013 | Pai et al. | |

* cited by examiner

SECONDARY DISCONNECT ASSEMBLY FOR A SWITCHING DEVICE

BACKGROUND OF THE DISCLOSURE

The subject matter disclosed herein relates to a secondary disconnect assembly, and more particularly to a secondary disconnect assembly for enabling manual and automatic connection of a secondary connector of a switching device.

Switchgear, such as medium voltage ("MV") switchgear, includes various components secured within an enclosed structure or "drawout" unit. The switchgear enclosure is divided into compartments, such as one or more circuit breaker compartments each housing a circuit breaker, an electrical bus bar compartment housing a bus bar system, and one or more cable connection compartments. The circuit breakers in the circuit breaker compartments can be electrically connected to the bus bar system in the bus bar compartment using primary contacts. The drawout units releasably connect the circuit breakers to the busbar. It is sometimes necessary, such as for scheduled maintenance or testing purposes, to move, or "rack", the circuit breakers in and out of the enclosure to make and break electrical connection within an electrical power distribution circuit. Conventional drawout units are configured to rack the circuit breakers between a. disconnect position, in which the primary contacts or terminals of the circuit breaker are fully disengaged from mating primary contacts within the enclosure, and a connect position in which the primary contacts of the circuit breaker and enclosure are fully engaged. A racking mechanism is typically employed to ensure steady movement of the circuit breaker as it moves between the disconnect and connect positions.

Circuit breakers are also typically equipped with a variety of auxiliary electronic devices and related control circuitry, including switches, motors, solenoids and the like, for providing control of various functions of the circuit breaker. Terminals are conventionally arranged on the outside surface of the circuit breaker assembly to provide power to the auxiliary devices and control circuitry, and arranged for automatic connection and disconnection from corresponding mating terminals or contacts arranged within the enclosure. Such corresponding terminals arranged on the circuit breaker and the enclosure are conventionally referred to as "secondary disconnect" terminals or contacts, to distinguish these terminals from the main or "primary" current-carrying circuit breaker and enclosure terminals.

When the circuit breaker is inserted, or racked in, from the disconnect position to the connect position, the corresponding secondary disconnect terminals on the circuit breaker and enclosure must be engaged for power to be provided to the auxiliary devices and control electronics. Conversely, when the circuit breaker is removed, or racked out, to the disconnect position, the secondary disconnect terminals can he disengaged. Additionally, it is common to provide a test position, between the connect and disconnect positions of the circuit breaker, wherein the secondary disconnect terminals are engaged, but the primary terminals are not engaged. In such cases, the auxiliary functions of the circuit breaker can be safely tested while the circuit breaker is disconnected from the primary circuit, or "OFF".

It is generally desirable for the secondary terminals to engage as the circuit breaker is racked in to the test position, and to remain engaged (when manually operated) as the circuit breaker continues to be racked in past the test position to the full connect position. Likewise, upon removal of the circuit breaker, it is generally desirable for the corresponding secondary terminals to remain engaged as the circuit breaker is racked out from the connect position back to the test position, but to disengage if the circuit breaker is racked out past the test position to the full disconnect position. Apparatus for connecting and disconnecting the corresponding secondary terminals of the circuit breaker and enclosure are generally referred to in the art as "secondary disconnect" apparatus. Generally, secondary disconnect apparatus operates such that engagement and disengagement of the secondary terminals is incident to the racking movement of the circuit breaker into and out of its enclosure.

Many conventional secondary disconnect apparatus include any number of pairs of corresponding or mating secondary terminals arranged f©r slidable connection. In many cases, half of each pair of mating secondary terminals includes a. conductive surface or receptacle fixedly coupled to the enclosure, while the corresponding half of each pair includes a conductive member fixedly coupled to the circuit breaker. In operation, as the circuit breaker is racked in to the test position, each corresponding pair of secondary terminals slide upon each other and make electrical contact when manually operated when breaker is in the test position. As the circuit breaker is subsequently racked past the test position and into the full connect position, each corresponding pair of secondary terminals slide against each other, thereby maintaining electrical contact. Conversely, when the circuit breaker is racked out of the enclosure, each corresponding pair of terminals disconnect or slide of each other and disconnect.

BRIEF DESCRIPTION OF THE DISCLOSURE

According to one aspect of the disclosure, a secondary disconnect assembly for a switching device includes a first mounting bracket configured to support a secondary connector of a switching device system, a telescopic arrangement connected to the first mounting bracket, a slider connected to the telescopic arrangement, and a second mounting bracket including a projection. The second mounting bracket is operable to move with the switching device. The slider is engageable with the projection and movable with the second mounting bracket in an automatic operation of the secondary disconnect assembly. The slider is disengageable from the projection and movable with respect to the second mounting bracket in a manual operation of the secondary disconnect assembly.

According to another aspect of the disclosure, a switching device system includes a switching device, an undercarriage, and a secondary disconnect assembly. The switching device includes a primary connector and a secondary connector. The undercarriage includes a first side wall, a second side wall opposite the first side wall, a third side wall, and a fourth side wall opposite the third side wall. The switching device is movable with respect to the undercarriage. The secondary disconnect assembly includes a first mounting bracket configured to support the secondary connector, a telescopic arrangement connected to the first mounting bracket, a slider connected to the telescopic arrangement, and a second mounting bracket including a projection, the second mounting bracket operable to move with the switching device. The slider is engageable with the projection and movable with the second mounting bracket in an automatic operation of the secondary disconnect assembly. The slider is disengageable from the projection and movable with respect to the second mounting bracket in a manual operation of the secondary disconnect assembly.

According to yet another aspect of the disclosure, a method of connecting a secondary connector of a switching device, includes movably supporting the switching device with respect to an undercarriage; arranging a secondary disconnect assembly on the switching device, the secondary disconnect assembly including a first mounting bracket, the secondary connector supported on the first mounting bracket, a telescopic arrangement connected to the first mounting bracket, a slider connected to the telescopic arrangement, and a second mounting bracket including a projection, the second mounting bracket fixed with respect to the switching device, the second mounting bracket operable to move with the switching device, the slider biased towards the projection; automatically connecting the secondary connector into a socket by locking the slider into engagement with the projection and moving the slider with the switching device, or manually connecting the secondary connector into a socket by disengaging the slider from the projection and manually pushing the slider with respect to the switching device; retaining the first mounting bracket and secondary connector stationary with respect to the undercarriage while compressing the telescopic arrangement; and moving the first mounting bracket and secondary connector with the switching device with respect to the undercarriage after the telescopic arrangement is fully compressed.

These and other advantages and features will become more apparent from the following description taken in conjunction with the drawings.

BRIEF DESCRIPTION OF THE DRAWING

The subject matter, which is regarded as the disclosure, is particularly pointed out and distinctly claimed in the claims at the conclusion of the specification.

The foregoing and other features, and advantages of the disclosure are apparent from the following detailed description taken in conjunction with the accompanying drawings in which.

The detailed description explains embodiments of the disclosure, together with advantages and features, by way of example with reference to the drawings.

DETAILED DESCRIPTION OF THE DISCLOSURE

Figure 1:
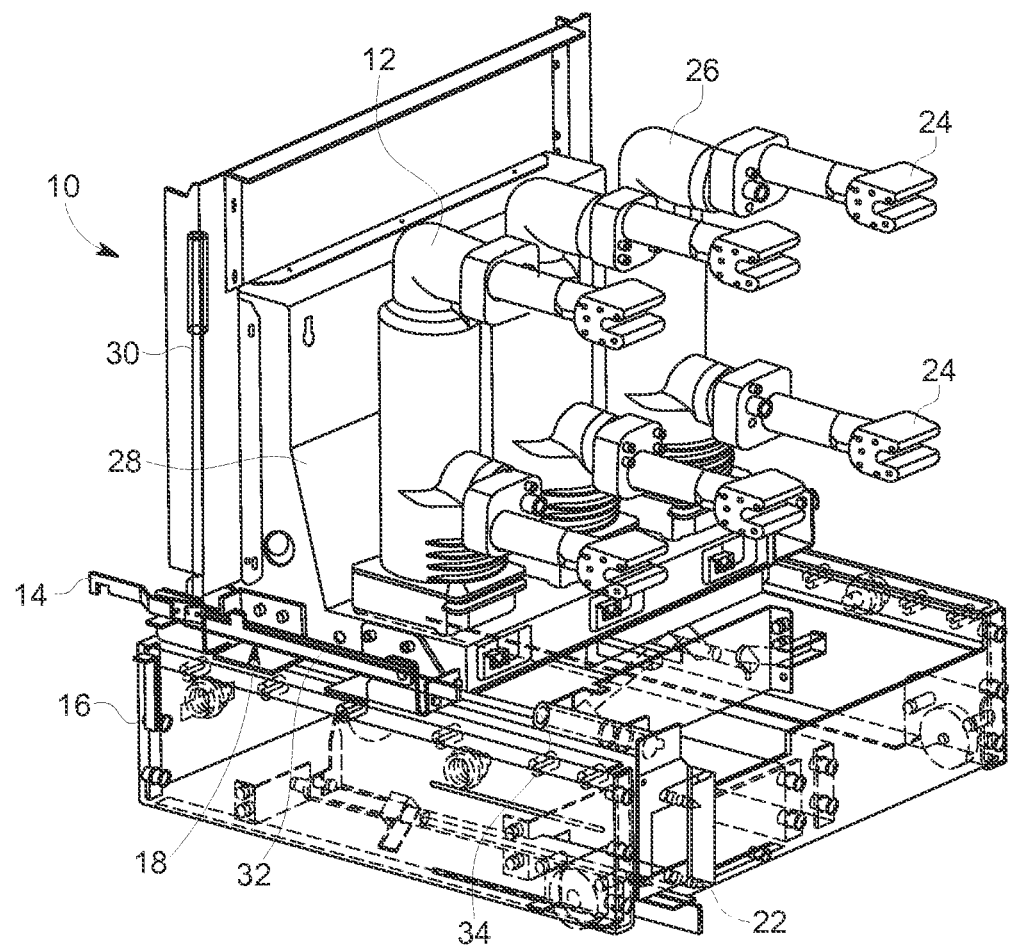
FIG. 1 is a perspective view of one embodiment of switching device system.

With reference to FIG. 1, a switching device system 10 is shown to include a switching device 12, such as a circuit breaker, a racking engagement lever 14 for racking in and out the circuit breaker 12, an undercarriage 16 surrounding the racking engagement lever 14, and a secondary disconnect assembly 18 for shifting the secondary connector 20 (FIG. 3), such as a secondary plug, received on the secondary connector mounting bracket 22 (a first mounting bracket of the secondary disconnect assembly 18) into a connected position. The circuit breaker 12 includes primary connectors 24 for each pole in the pole assembly 26 of the circuit breaker 12, and a housing 28. The connectors 24 include contacts as shown, and may further include grippers (FIGS. 6-11) to assist in receiving mating connectors. The pole assembly 26 contains pairs of interrupter switches, and the housing 28 contains auxiliary devices and control circuitry. Power is supplied to the auxiliary devices and control circuitry through a pair of mating secondary contact members, including the secondary connector 20 and a secondary socket arranged in the enclosure.

Figure 2:
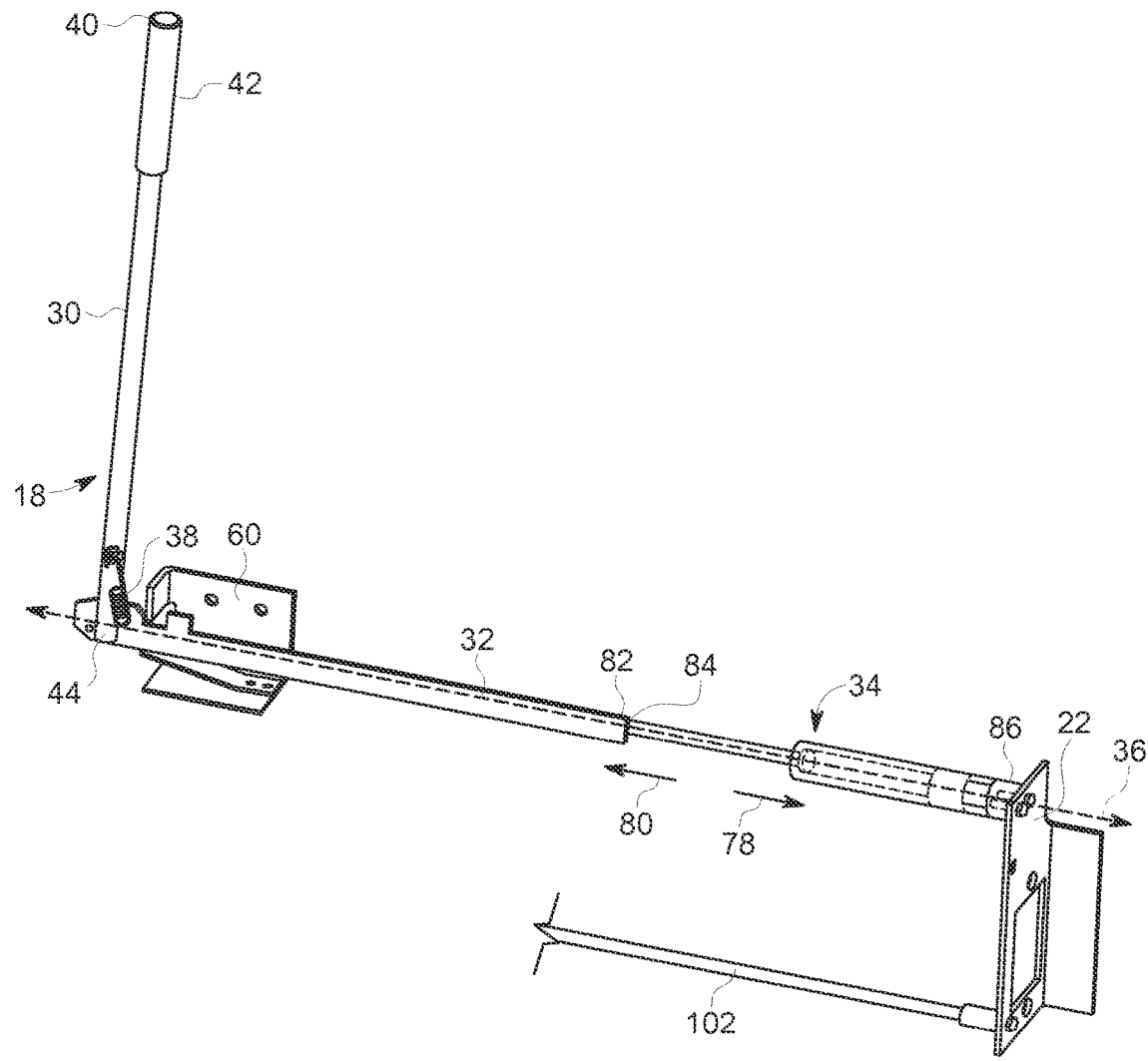
FIG. 2 is a perspective view of one embodiment of a secondary disconnect assembly for the switching device system of FIG. 1.
Figure 3:
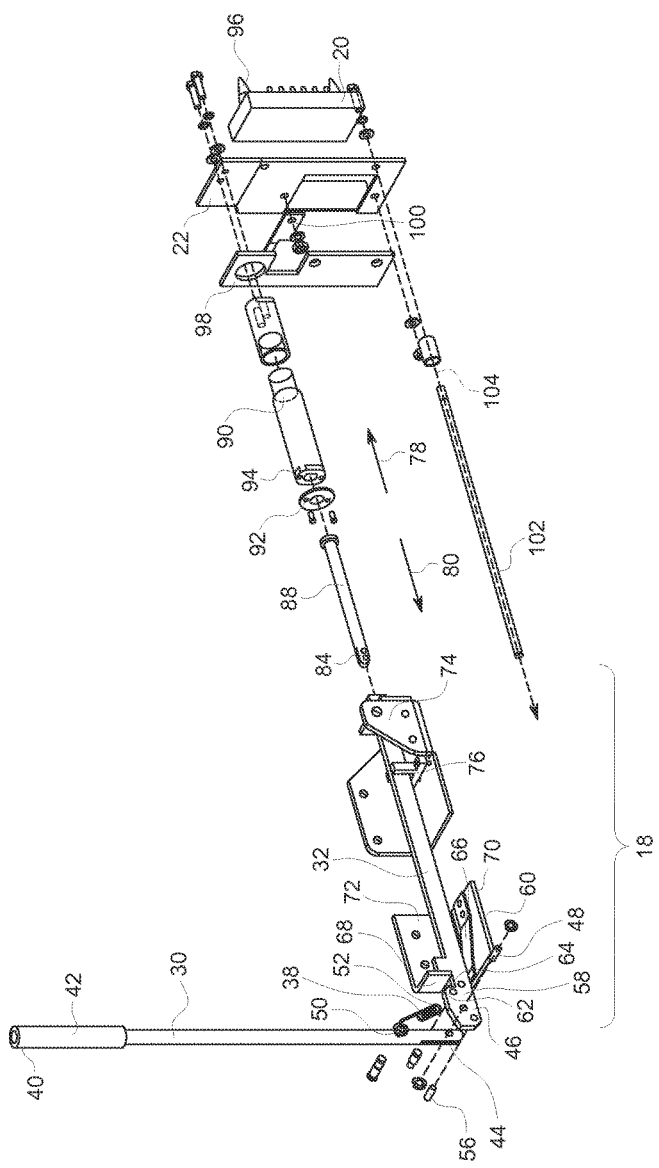
FIG. 3 is an exploded perspective view of the secondary disconnect assembly of FIG. 2.

The secondary connector 20 is movable automatically or manually to move the secondary connector 20 into a connected position. To manual move the secondary connector 20 into the connected position while the switching device 12 remains disconnected, the secondary disconnect assembly 18 includes a manual handle 30, a slider 32, a telescopic arrangement 34, and the secondary connector mounting bracket 22. Normal biased position of the handle 30 is shown in FIG. 1, with the handle 30 at a non-zero angle, such as a substantially perpendicular angle, from the slider 32. When desired, the handle 30 can be pulled down from its biased position shown in FIG. 1 into a position substantially in line with a longitudinal axis 36 of the telescopic arrangement 34 (FIG. 7) and pushed to move the secondary connector 20 into engagement towards a secondary socket or pulled to disconnect the secondary connector 20 from the secondary socket. When manual movement of the secondary disconnect assembly 18 disconnects the secondary connector 20, the manual handle 30 will return to the biased position shown in FIG. 1 due to extension spring 38 (FIGS. 2 and 3). In the biased condition shown in FIG. 1, the secondary disconnect assembly 18 is operable to automatically move the secondary connector 20 towards the socket.

FIGS. 2 and 3 show further details of the secondary disconnect assembly 18. The secondary disconnect assembly 18 includes the manual handle 30. A first end 40 of the manual handle 30 may include an ergonomic portion 42, and a second end 44 of the manual handle 30 is hingedly connected to a first end 46 of the slider 32, such as via a hinge pin 48. The manual handle 30 is biased in the non-zero angled position, such as but not limited to substantially perpendicularly, with respect to the slider 32 by the extension spring 38. A first end 50 of the extension spring 38 is connected to the manual handle 30, and a second end 52 of the extension spring 38 is connected to the slider 32. The extension spring 38 does not over-rotate the manual handle 30 onto the slider 32 because such further movement is blocked, such as by a handle blocking wall 54 (FIG. 4) extending from the switching device 12. A stopper pin 56 may prevent the manual over rotation of the manual handle 30 during manual operation by restricting rotation of the handle 30 below axis 36. Adjacent the first end 46 of the slider 32 is a manual override cam 58 for cooperating with a leaf spring mounting bracket 60, serving as a second bracket within the secondary disconnect assembly 18. The manual override cam 58 includes a cammed surface 62 and an adjacent cutout 64 in the slider 32. The manual override cam 58 of the slider 32 is biased in the mounting bracket 60 by a biasing device, such as leaf spring 66, such that a projection 68 from the mounting bracket 60 rests in the cutout 64 when the leaf spring 66 biases the cutout 64 of the manual override cam 58 towards the projection 68. The leaf spring 66 maintains the cutout 64 in close contact with the projection 68. The mounting bracket 60 travels with the switching device 12 and may include a first portion 70 supporting the leaf spring 66, a second portion 72 substantially perpendicular to the first portion 70 and attached to an outer portion of the switching device 12, and the projection 68 extending substantially perpendicularly from the second portion 72. When assembled, the slider 32 is positioned between the leaf spring 66 and the projection 68. A guide mounting bracket 74 (a third mounting bracket in the secondary disconnect assembly 18) having a guide 76 may be further provided to assist in guiding the slider 32 in directions 78, 80 along the longitudinal axis 36.

Connected to a second end 82 of the slider 32 is a first end 84 of a telescopic arrangement 34 that is operable to alter the length from the first end 46 of the slider 32 to the second end 86 of the telescopic arrangement 34. By altering the stroke length of the telescopic arrangement 34, varying travel distances of switching devices 12 can be accommodated. FIG. 2 shows the length from the first end 46 of the slider 32 to the second end 86 of the telescopic arrangement 34 having a maximum length. As can be understood, as the slider 32 is pushed towards the second end 86 of the telescopic arrangement 34, the length from the first end 46 of the slider 32 to the second end 86 of the telescopic arrangement 34 will be shortened. The telescopic arrangement 34 may take on a variety of mechanical configurations. For example, as in the illustrated embodiment, the telescopic arrangement 34 may include a sliding rod 88 receivable within a cylindrical telescopic rod 90. Alternatively, the slider 32 and the sliding rod 88 may be integral. In yet another alternative embodiment, the positions of the rods 88 and 90 may be reversed. In a further alternative embodiment, the telescopic arrangement 34 may include a pin and groove on adjacent slidable members. In the illustrated embodiment of the telescopic arrangement 34, a stopper plate 92 at a first end 94 of the cylindrical telescopic rod 90 prevents over travel of the secondary connector 20 during manual operation when the switching device 12 is in a disconnected condition.

The second end 86 of the telescopic arrangement 34 is connected to the secondary connector mounting bracket 22. The secondary connector mounting bracket 22 is sized and configured to receive one or more secondary connectors 20 (secondary plugs) thereon. The secondary connector 20 may include one or more tapered pins 96 to allow for any misalignment in engagement of the secondary connector 20 with a secondary socket. A guide 98 for the telescopic rod 90 may be provided adjacent the secondary connector mounting bracket 22. The secondary connector mounting bracket 22 may further include a cable support 100 to support cables and wiring extending from the secondary connector 20 to prevent their entanglement with the secondary disconnect assembly 18. The secondary connector mounting bracket 22 may further be connected to a guide rod 102 for guiding movement of the secondary disconnect assembly 18 when the handle 30 pushes the mounting bracket 22 away from the undercarriage 16. That is, when the mounting bracket 22 is moved from the undercarriage 16, the guide rod 102 assures that the alignment of the secondary connector 20 carried by the mounting bracket 22 with respect to the secondary socket is maintained. Thus, the guide rod 102 ensures linearity of connector travel in directions 78, 80 and further prevents undue rotation of the handle 30. The guide rod 102 has a longitudinal axis 104 at least substantially parallel with the longitudinal axis 36.

Figure 4:
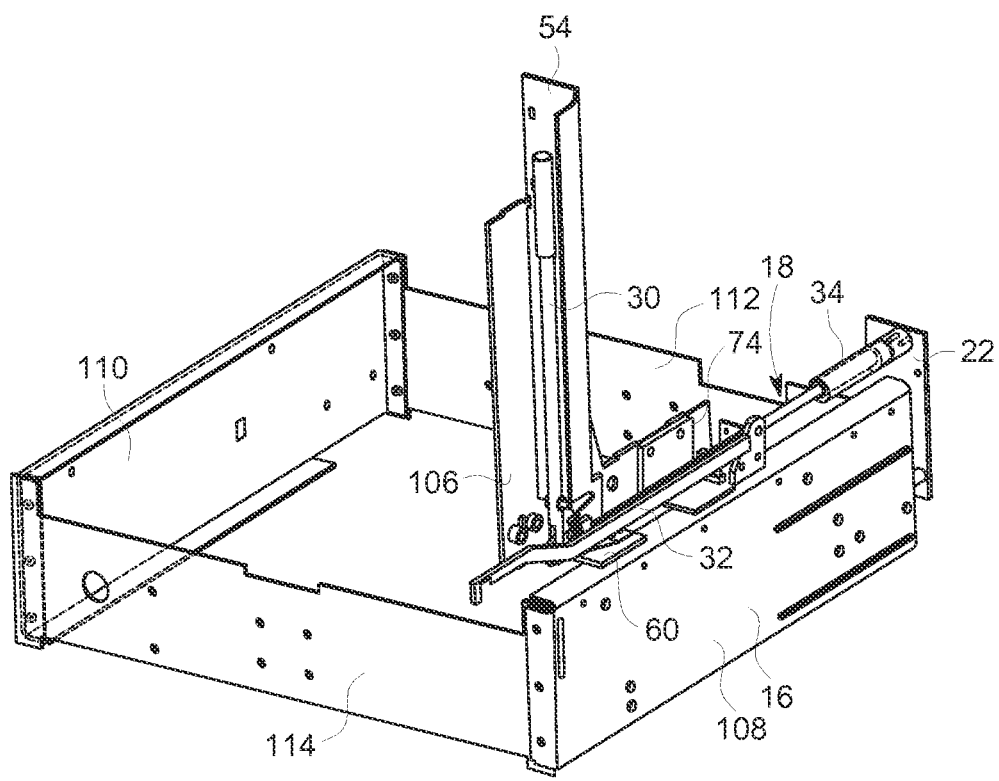
FIG. 4 is a perspective view of the secondary disconnect assembly of FIG. 2 in relation to one embodiment of an undercarriage.
Figure 5:
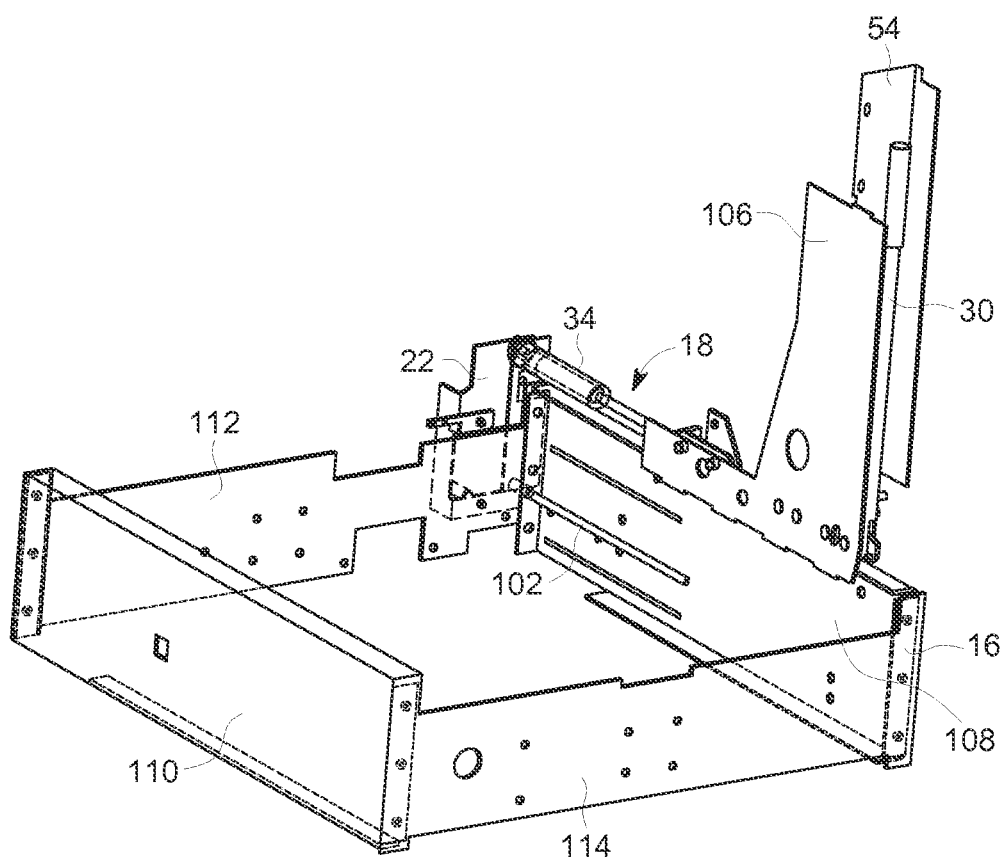
FIG. 5 is another perspective view of the secondary disconnect assembly of FIG. 2 in relation to the undercarriage of FIG. 4.

FIG. 4 depicts the handle blocking wall 54, mounting bracket 60, and the secondary disconnect assembly 18 assembled relative to the undercarriage 16. A breaker connection piece 106 may be secured to the switching device 12 and connected to the handle blocking wall 54 and the mounting bracket 60. The undercarriage 16 includes a first side wall 108 and a second side wall 110 opposite the first side wall 108. The secondary disconnect assembly 18 is positioned adjacent to the first side wall 108. Third and fourth side walls 112, 114 connect the first side wall 108 to the second side wall 110. The secondary connector mounting bracket 22 is positioned adjacent the third side wall 112 in the retracted position of the mounting bracket 22 and the disconnected condition of the secondary connector 20, and the mounting bracket 22 is spaced from the third side wall 112 in the extended position of the mounting bracket 22 and the connected condition of the secondary connector 20. As shown in FIG. 5, the guide rod 102 may be located on an inner surface of the first side wall 108 facing an inner surface of the second side wall 110.

Figure 6:
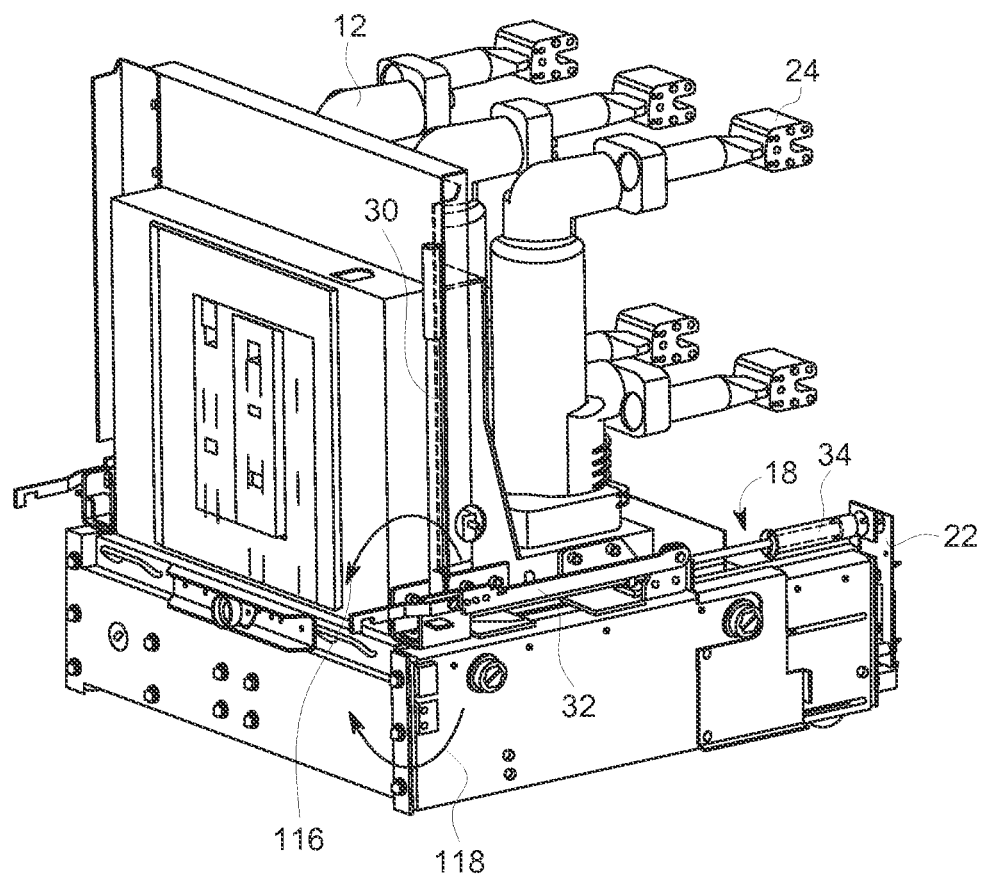
FIGS. 6-8 show a perspective view of a portion of the switching device system in different stages of a manual operation of moving the secondary connector; and, FIGS. 9-11 show a perspective view of the switching device system in different stages of an automatic operation of moving the secondary connector.
Figure 7:
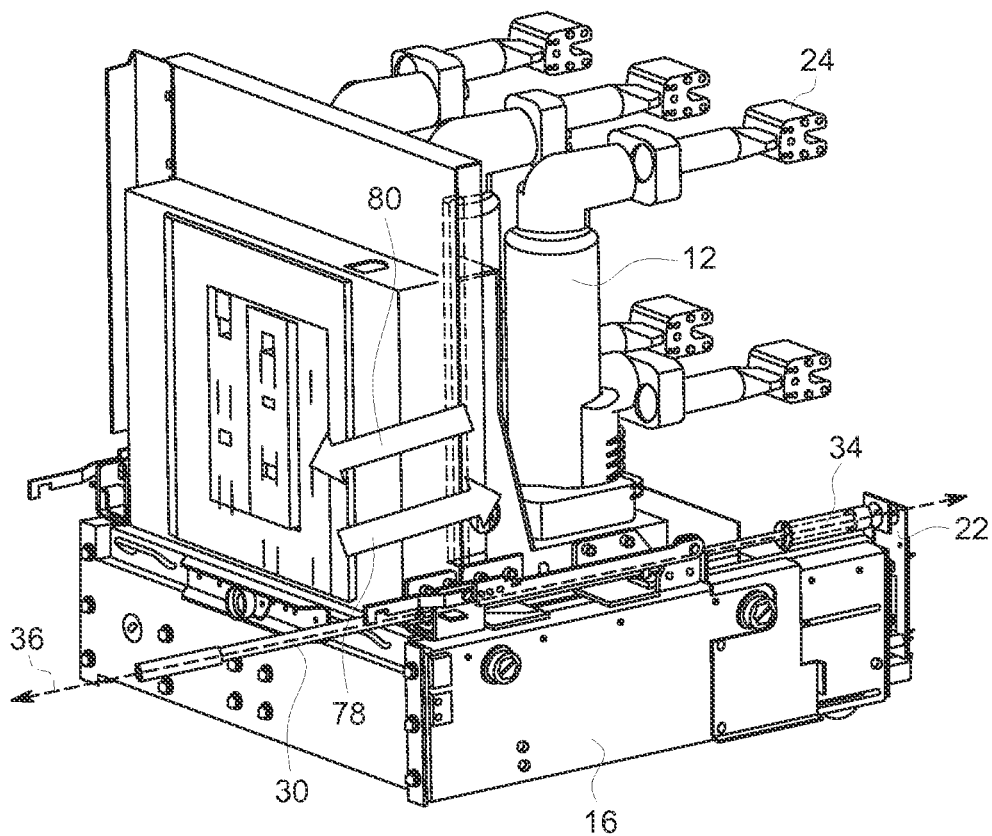
Figure 8:
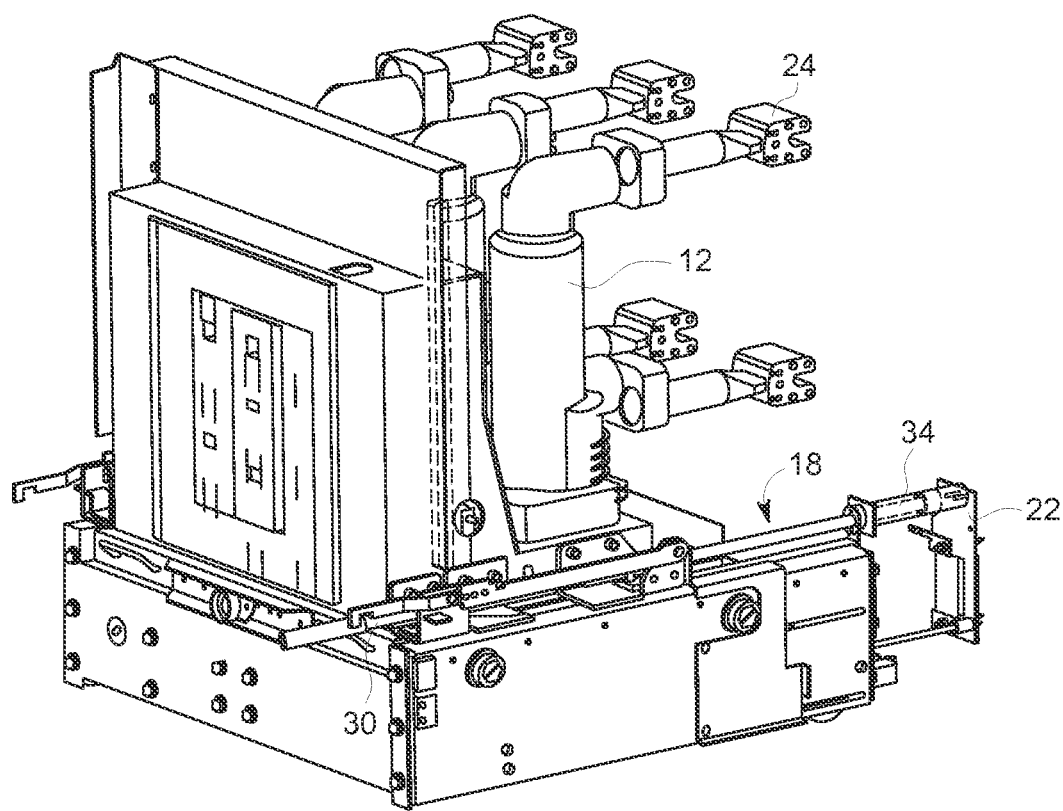

Turning now to FIGS. 6-8, manual movement of the secondary disconnect assembly 18 will be described. As shown in FIG. 6, the switching device 12 is in a disconnected condition, as is the secondary connector 20. To move the secondary connector 20 manually from the disconnected condition to the connected condition, the manual handle 30 is rotated against its spring bias, in rotational direction 116, until the manual handle 30 at least substantially aligns with the longitudinal axis 36 (shown in FIG. 2). In this position as demonstrated by FIG. 7, the manual handle 30 can easily compress the leaf spring 66 such that the camming surface 62 is free of the projection 68 and the manual handle 30 can then be pushed in direction 78 to move the secondary connector 20 towards the secondary outlet, into a connection position as demonstrated by FIG. 8. In this test position, where the secondary connector 20 is connected but the switching device 12 is disconnected, the handle 30 is trapped between the projection 68 and the leaf spring 66 and cannot rotate back to its biased position. When the operator starts racking in the switching device 12, the mounting bracket 60 moves towards the cutout 64 in the slider 32 until the projection 68 becomes engaged with the cutout 64 just prior to the connected position of the switching device primary connector 24 to ensure no further relative motion occurs between the switching device 12 and the secondary connector 20.

To reverse the operation by moving the secondary connector 20 from the connected position shown in FIG. 8 to the disconnected position shown in FIG. 6, the operator pulls the handle 30 in direction 80 to release the secondary connector 20 from the secondary socket and return the secondary connector mounting bracket 22 to the third side wall 112 of the undercarriage 16 as shown in FIG. 7, at which point the telescopic arrangement 34 will expand until the cutout 64 aligns and engages with the projection 68 due to the spring force of the leaf spring 66 and the manual handle 30 will move in rotational direction 118 towards the handle blocking wall 54 due to the spring force of the extension spring 38.

Figure 9:
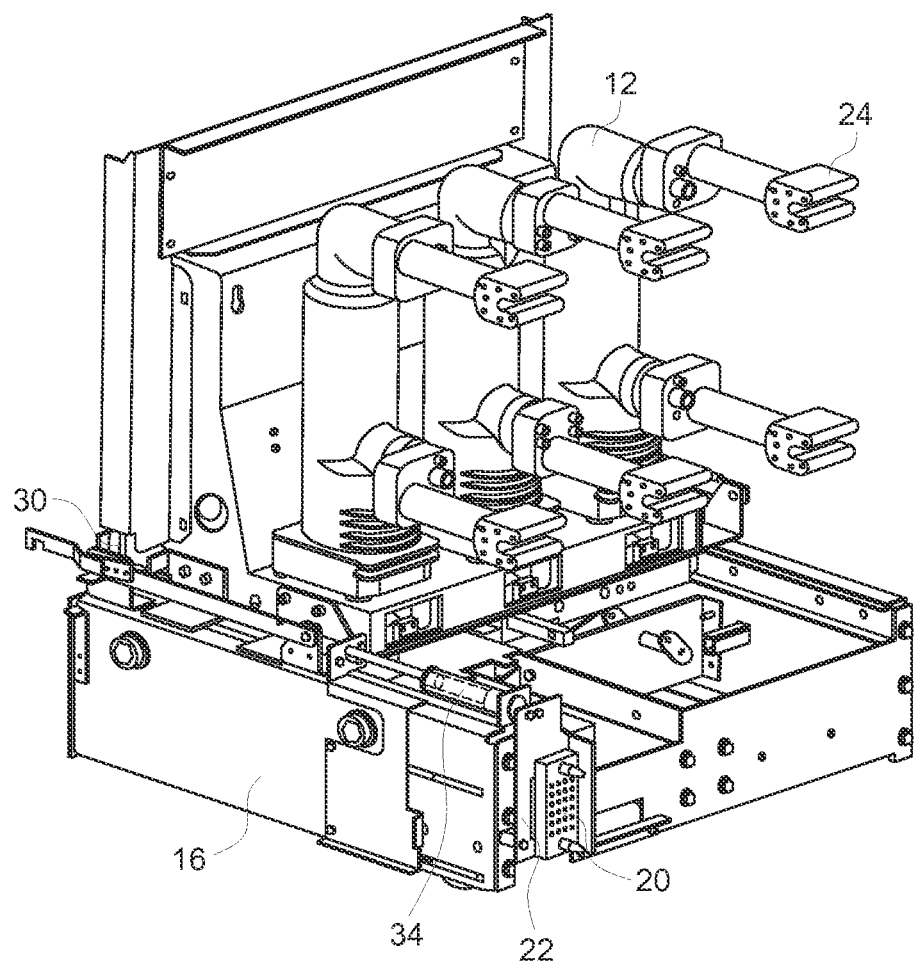
Figure 10:
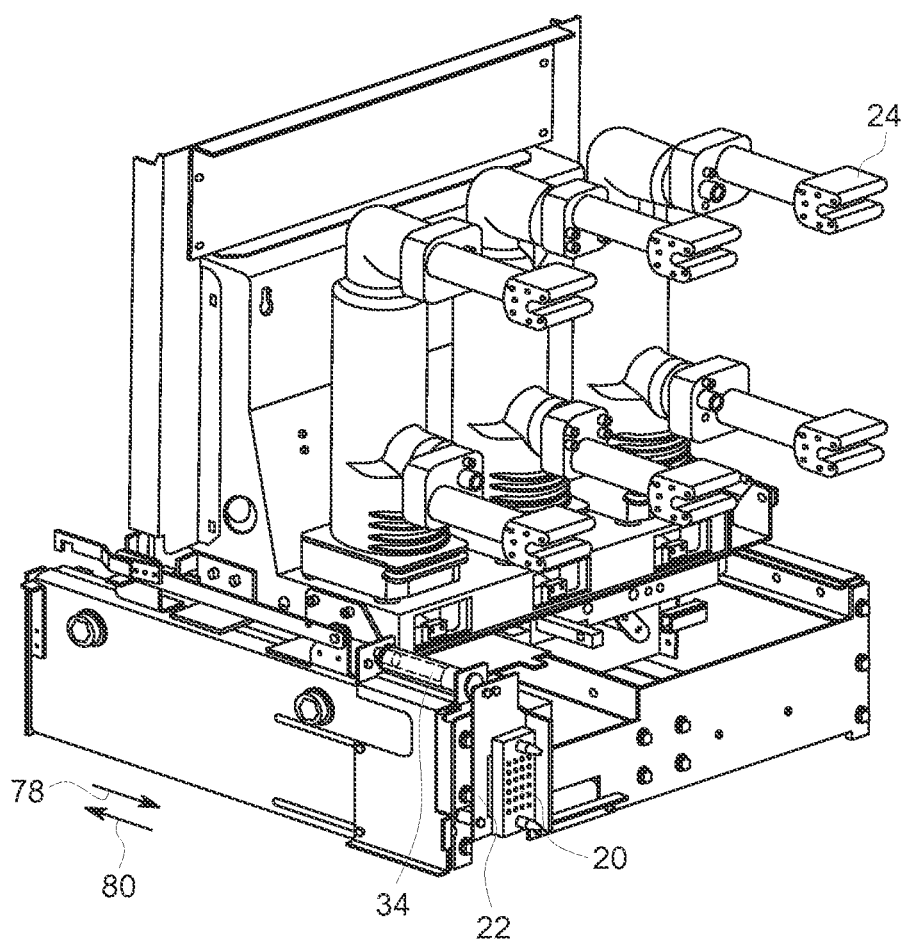
Figure 11:
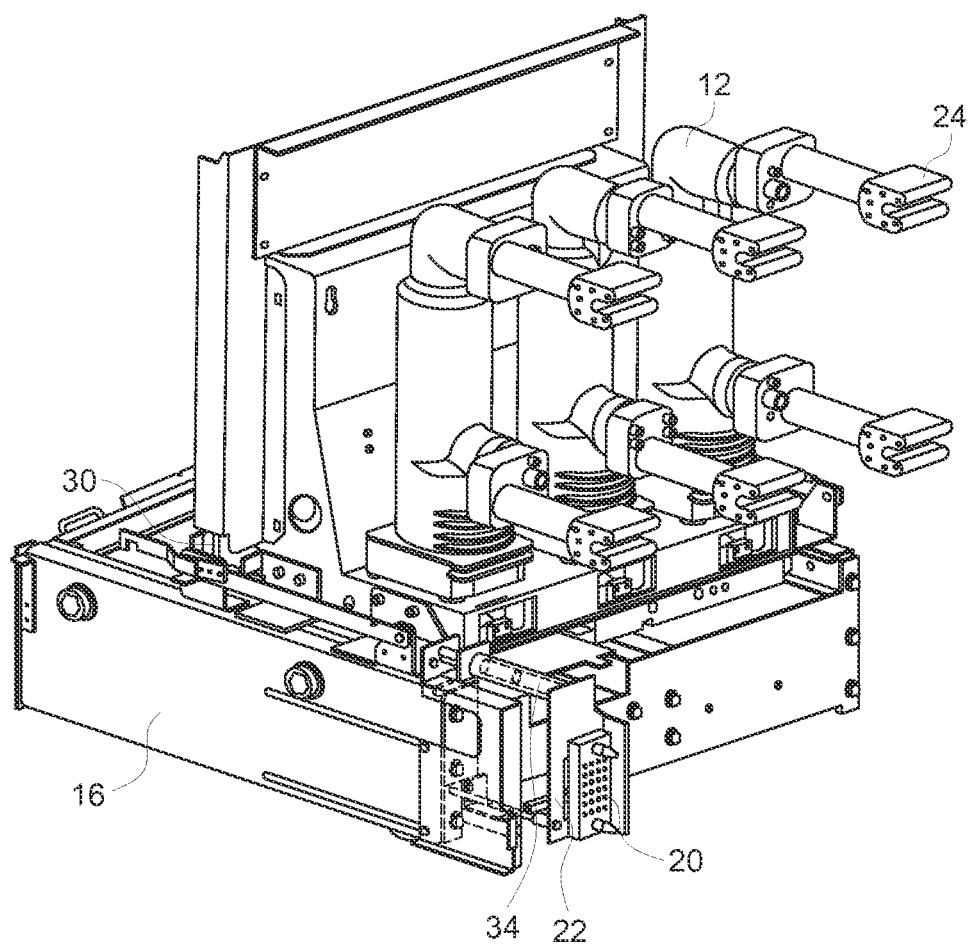

Turning now to FIGS. 9-11, automatic movement of the secondary disconnect assembly 18 and switching device 12 will be described. The initial position is shown in FIG. 9, where both the secondary connector 20 and the primary connector 24 are disconnected from their respective connections. Note that the handle 30 is in its biased condition at a non-zero angle with respect to the longitudinal axis 36 (FIG. 2). In FIG. 10, the switching device 12 travels a fixed distance, equivalent to the stroke distance allotted by the telescopic arrangement 34, before the secondary connector 20 makes any travel. The cutout 64 in the manual override cam 58 and projection 68 ensure that the switching device 12 is engaged with the secondary disconnect assembly 18 to ensure no relative motion occurs between the switching device 12 and the secondary disconnect assembly 18 during the automatic operation. That is, the slider 32 and switching device 12 travel together. When the telescopic arrangement 34 is fully compressed, then further movement of the slider 32 (and further movement of the switching device 12) will force the telescopic rod 90 in direction 78 to push the secondary connector 20 away from the third side wall 112 with further movement of the switching device 12, as shown in FIG. 11. FIG. 11 depicts a connected position, or service position as the primary connectors 24 of the switching device 12 are connected, as well as the secondary connector 20.

The automatic operation can also be reversed by disconnecting the secondary connector 20 and the switching device 12 from their respective contacts in direction 80. Due to the projection 68 being engaged within the cutout 64, the stroke distance allotted by the telescopic arrangement 34 will be covered and then the secondary connector 20 will become disconnected moving with the switching device 12 until the secondary connector mounting bracket 22 reaches the third side wall 112 as shown in FIG. 10 and the switching device 12 is in the initial position shown in FIG. 9.

Per the Institute of Electrical and Electronics Engineers ("IEEE") standard, a secondary connector 20, such as a secondary plug, should connect automatically whenever a switching device 12, such as a circuit breaker, is moved from a disconnected position to a service (connected) position. Certain types of switchgear enclosures include a secondary disconnect socket for receiving the secondary plug near a bottom of the switching device (circuit breaker) compartment. The secondary disconnect assembly 18 described herein may be a retrofit for accommodating a switching device 12 that is previously engaged/disengaged at the top of the switching device 12. Thus, use of that switching device 12 in the switchgear enclosure with a secondary disconnect socket near the bottom of the circuit breaker compartment requires a retrofit. For IEEE market, customer needs automatic secondary plug in addition to manual operation. So the secondary disconnect assembly 18 fulfills customer requirements by enabling both automatic and manual connection of the secondary connector 20. Also, to accommodate for different stroke distances, the secondary disconnect assembly 18 includes a telescopic arrangement 34. With this secondary disconnect assembly 18, different types of switching devices 12 can be sold in IEEE market and also provide the same interface to a panel. The secondary disconnect assembly 18 is less expensive than providing a whole new racking system for the retrofitted switching device 12.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims

The invention claimed is:

1. A secondary disconnect assembly for a switching device, the switching device including a primary connector and a secondary connector, the secondary disconnect assembly including:
   a first mounting bracket configured to support the secondary connector;
   a telescopic arrangement connected to the first mounting bracket;
   a slider connected to the telescopic arrangement; and,
   a second mounting bracket including a projection, the second mounting bracket operable to move with the switching device;
   wherein the slider is engageable with the projection and movable with the second mounting bracket in an automatic operation of the secondary disconnect assembly, and the slider is disengageable from the projection and movable with respect to the second mounting bracket in a manual operation of the secondary disconnect assembly.

2. The secondary disconnect assembly of claim 1, wherein the slider is movable along a longitudinal axis of the telescopic arrangement.

3. The secondary disconnect assembly of claim 1, wherein the telescopic arrangement includes a first end connected to the slider and a second end connected to the first mounting bracket.

4. The secondary disconnect assembly of claim 1, wherein the second mounting bracket includes a leaf spring, the slider disposed between the leaf spring and the projection.

5. The secondary disconnect assembly of claim 1, wherein the slider is biased towards the projection.

6. The secondary disconnect assembly of claim 5, further comprising a leaf spring to bias the slider towards the projection.

7. The secondary disconnect assembly of claim 5, wherein the slider includes a cutout to engage with the projection, the slider and the second mounting bracket movable together when the cutout is aligned and engaged with the projection, and the slider includes a camming surface to disengage from the projection when the slider is moved against its bias to misalign the cutout from the projection.

8. The secondary disconnect assembly of claim 1, further comprising a manual handle pivotally connected to the slider, the manual handle biased at a non-zero angle with respect to a longitudinal axis of the slider and telescopic arrangement.

9. The secondary disconnect assembly of claim 8, further comprising an extension spring connected to the manual handle and the slider to bias the manual handle at the non-zero angle.

10. The secondary disconnect assembly of claim 9, wherein the manual handle is movable against its bias to substantially align with the longitudinal axis of the telescopic arrangement in the manual operation of the secondary disconnect assembly.

11. A switching device system comprising:
    a switching device including a primary connector and a secondary connector;
    an undercarriage including a first side wall, a second side wall opposite the first side wall, a third side wall, and a fourth side wall opposite the third side wall, the switching device movable with respect to the undercarriage; and, a secondary disconnect assembly including:
- a first mounting bracket configured to support the secondary connector;
- a telescopic arrangement connected to the first mounting bracket;
- a slider connected to the telescopic arrangement; and,
- a second mounting bracket including a projection, the second mounting bracket operable to move with the switching device;
- wherein the slider is engageable with the projection and movable with the second mounting bracket in an automatic operation of the secondary disconnect assembly, and the slider is disengageable from the projection and movable with respect to the second mounting bracket in a manual operation of the secondary disconnect assembly.

12. The switching device system of claim 11, wherein the first mounting bracket is movable towards and away from the third side wall in the manual operation, and movable with the switching device in the automatic operation.

13. The switching device system of claim 11, wherein the secondary connector is a secondary plug having a tapered pin.

14. The switching device system of claim 11, wherein the slider and telescopic arrangement extend along the first side wall.

15. The switching device system of claim 11, further comprising a manual handle pivotally connected to the slider, the manual handle biased at a non-zero angle with respect to a longitudinal axis of the slider and telescopic arrangement.

16. The switching device system of claim 11, further comprising a guide rod spaced from and substantially parallel to a longitudinal axis of the slider and telescopic arrangement, the guide rod configured to ensure linear movement of the secondary connector.

17. The switching device system of claim 11, wherein the slider is biased towards the projection, the slider including a cutout to engage with the projection, the slider and the second mounting bracket movable together when the cutout is aligned and engaged with the projection, and the slider including a camming surface to disengage from the projection when the slider is moved against its bias to misalign the cutout from the projection.

18. A method of connecting a secondary connector of a switching device, the method comprising:
- movably supporting the switching device with respect to an undercarriage;
- arranging a secondary disconnect assembly on the switching device, the secondary disconnect assembly including a first mounting bracket, the secondary connector supported on the first mounting bracket, a telescopic arrangement connected to the first mounting bracket, a slider connected to the telescopic arrangement, and a second mounting bracket including a projection, the second mounting bracket fixed with respect to the switching device, the second mounting bracket operable to move with the switching device, the slider biased towards the projection;
- automatically connecting the secondary connector into a socket by locking the slider into engagement with the projection and moving the slider with the switching device, or manually connecting the secondary connector into a socket by disengaging the slider from the projection and manually pushing the slider with respect to the switching device;
- retaining the first mounting bracket and secondary connector stationary with respect to the undercarriage while compressing the telescopic arrangement; and,
- moving the first mounting bracket and secondary connector with the switching device with respect to the undercarriage after the telescopic arrangement is fully compressed.

19. The method of claim 18, wherein the secondary disconnect assembly includes a manual handle pivotally connected to the slider, the manual handle biased at a non-zero angle with respect to a longitudinal axis of the slider and telescopic arrangement, the method further including retaining the manual handle in a biased condition when automatically connecting the secondary connector, and moving the manual handle against its bias to disengage the slider from the projection when manually connecting the secondary connector.

20. The method of claim 18, wherein manually connecting the secondary connector includes retaining the primary connector of the switching device in a disconnected condition.

* * * * *